Feb. 13, 1968  D. VAN WYK ETAL  3,368,853
BEARING AND SEAL THEREFOR
Filed March 17, 1965 2 Sheets-Sheet 1
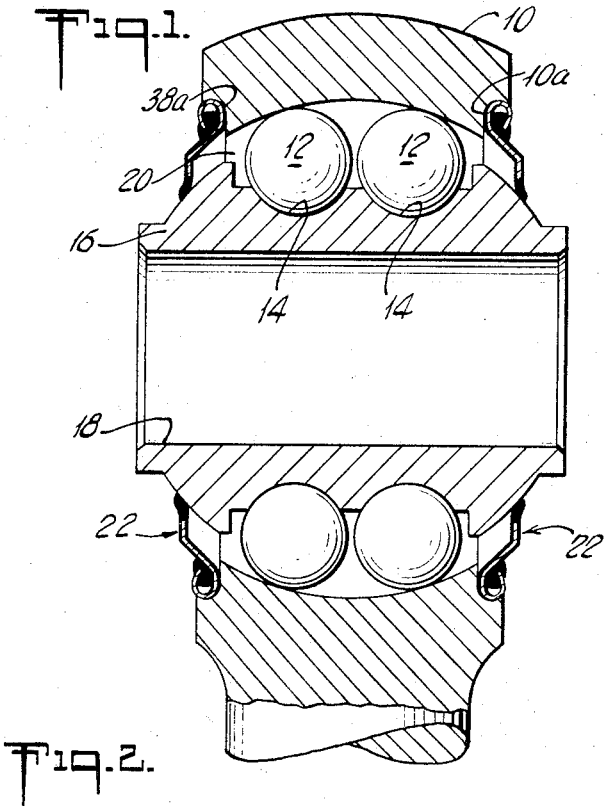
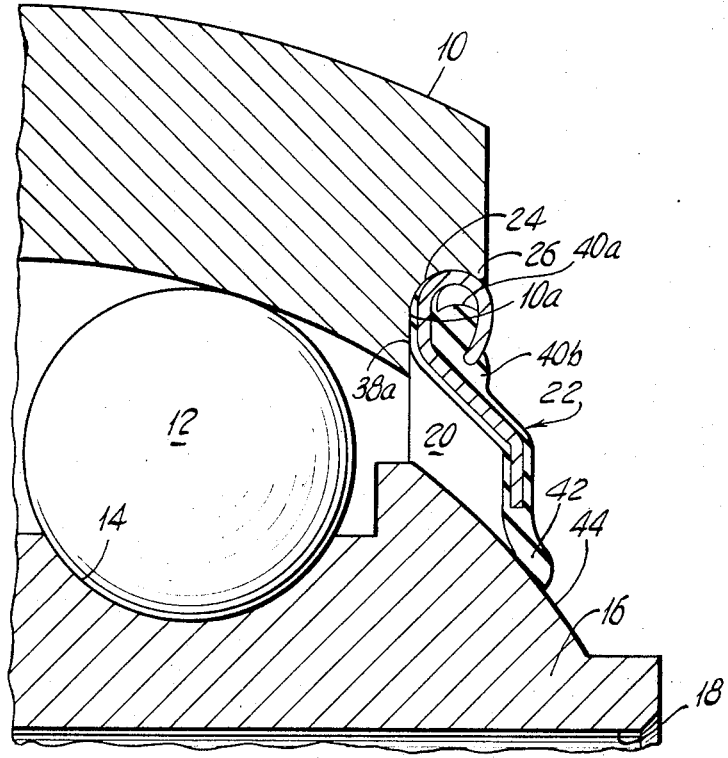
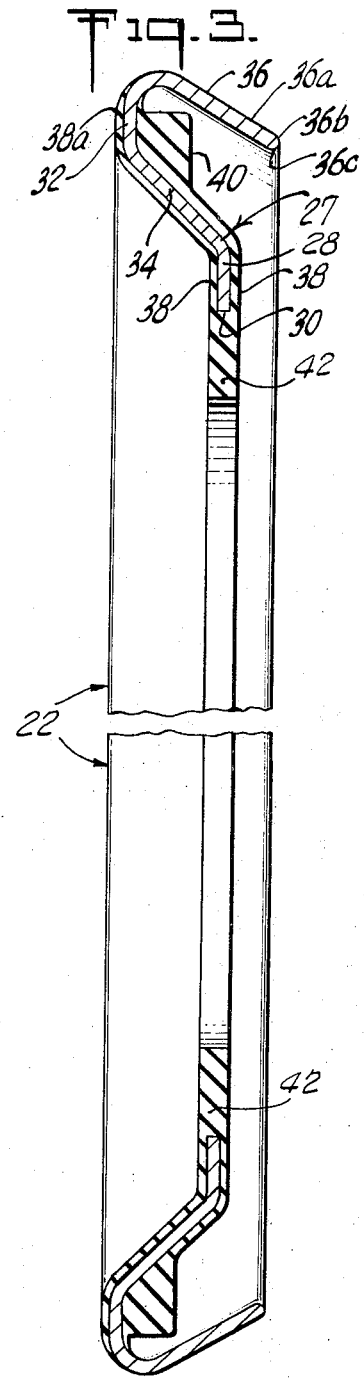
INVENTORS
DEREK VAN WYK
HERBERT D. MOE
BY
Hopgood & Calimafde
ATTORNEYS Feb. 13, 1968

D. VAN WYK ETAL 3,368,853

BEARING AND SEAL THEREFOR

Filed March 17, 1965

INVENTORS
DEREK VAN WYK
HERBERT D. MOE
BY
Hopgood & Calimafde
ATTORNEYS

United States Patent Office 3,368,853
Patented Feb. 13, 1968

3,368,853
BEARING AND SEAL THEREFOR
Derek Van Wyk, Newington, and Herbert D. Moe, Danielson, Conn., assignors to The Fafnir Bearing Company, New Britain, Conn., a corporation of Connecticut
Filed Mar. 17, 1965, Ser. No. 440,363
8 Claims. (Cl. 308—187.2)

ABSTRACT OF THE DISCLOSURE

A bearing sealing ring in which flexible sealing materials which cannot be securely bonded to metal can be employed. A sheath of such material is placed over a rigid underbody, and retained in place by crimping the periphery of the underbody over a raised portion of the sheath.

---

Figure 4:
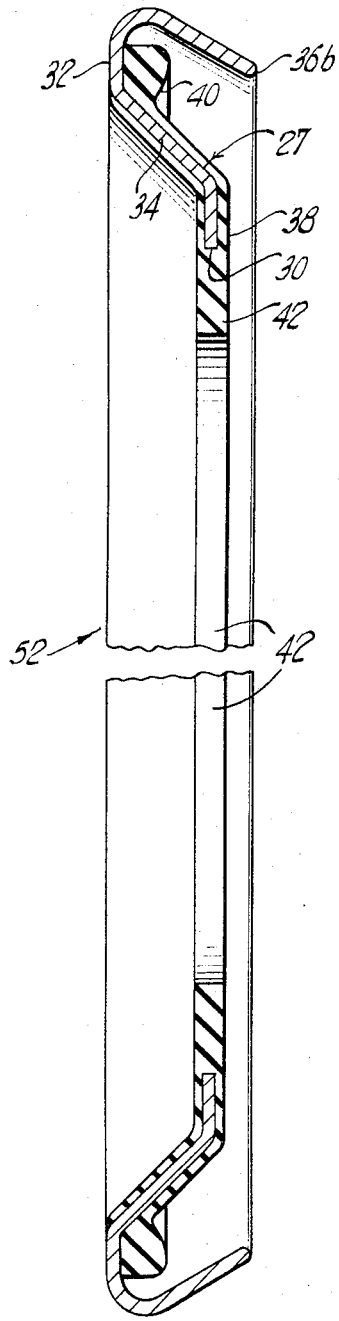

This invention relates to bearings and more particularly to bearings of the type which employ a bearing seal for retaining a lubricant therein while preventing the entry of dirt and foreign matter into the bearing.

Recent advances in various fields of technology have created a need for bearing assemblies of the type indicated capable of withstanding adverse environmental influences which cannot be withstood by known bearing structures. More particularly, bearings of the prior art which employ bearing seals having rubber as an element thereof, are unsatisfactory in that their ability to withstand high temperatures is considerably limited. Additionally, these bearing seals have limited resistance to oils, solvents and lubricants used in proximity thereto. As a result early deterioration of the seals occur, so that they fail to serve either to retain lubricant within the bearing or to keep out foreign matter.

Relatively new materials are now available which are considerably less susceptible to deterioration due to the adverse temperatures and fluid influences discussed above. One of the most satisfactory of these is a material known commercially as Silastic LS–53, and available through the Dow Corning Corporation. This material is a fluorosilicone rubber type material and has excellent resistance to fuels, oils and solvents and also has a useful temperature range of −100° Fahrenheit to +600° Fahrenheit, i.e., it does not deteriorate or lose its elasticity when exposed to such temperatures.

While the fluorosilicone rubber referred to above has substantial desirable characteristics, it also possesses a relatively low bond strength compared with prior art rubber type materials used for bearing seals of the type indicated. Futhermore, up to the present time, little success has been achieved in discovering or developing an adhesive which can be used in a molding operation to improve the bond strength of the fluorosilicone rubber to metallic materials used in bearing construction beyond the present best figure of approximately 10 lbs. per square inch of bonded area. It is possible to bond Silastic LS–53 rubber to steel with a room temperature vulcanizing compound so that an increase of 50% in the bond strength is achieved. However, the process is not feasible for seals of very small size. Furthermore, sandblasting or other roughening of the metal surface to be bonded does not materially improve the bond strength.

Accordingly, it is an object of this invention to provide a bearing seal comprising a base member and a flexible rubber-like material bonded thereto, wherein the rubber-like material has markedly improved high temperature characteristics and resistance to fluids and lubricants.

It is another object of the invention to provide a bearing seal of the type indicated in which the flexible rubber-like material is held to the metal member thereof in a novel manner.

Figure 5:
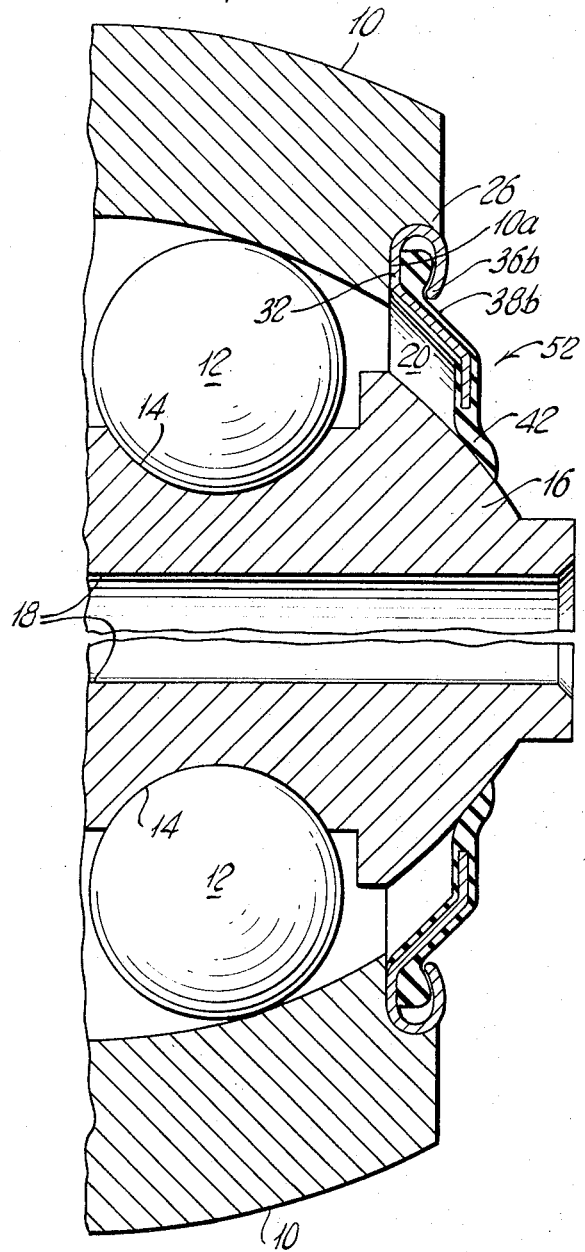

All of the objects, features and advantages of this invention and the manner of attaining them will become more apparent and the invention itself will be best understood by reference to the following description of an embodiment of the invention taken in conjunction with the accompanying drawing, in which:

FIG. 1 shows in cross-section a bearing and bearing seal construction in accordance with the invention, FIG. 2 is a fragmentary section of the bearing and bearing seal of FIG. 1, FIG. 3 shows in cross-section a portion of the bearing seal before assembly into the bearing, FIG. 4 shows in cross-section a further embodiment of a portion of a bearing seal similar to that of FIG. 3, and FIG. 5 is a fragmentary section of the bearing utilizing the bearing seal of FIG. 4.

Referring now to FIG. 1, there is shown a bearing construction having an outer ring 10 within which is provided a plurality of antifriction elements 12 which ride in recesses 14 in an inner ring 16. The inner ring 16 is further provided with a central aperture 18 for connection to a desired element with which the bearing is to be employed. A lubricant 20 is provided in the region between the inner and outer rings 10, 16 adjacent the antifriction elements 12. Bearing seals 22 are provided on opposite sides of the bearing structure to maintain the lubricant 20 in its proper repository adjacent the antifriction elements 12, and also to prevent the entry of dirt and foreign substance into the bearing.

Referring now also to FIG. 2, it will be seen that the bearing seals 22 are disposed in annular recesses 24 in the outer ring 10, being held firmly therein by inwardly extending annular lips 26 on the outer ring 10.

FIG. 3 shows in cross-section an embodiment of the bearing seal of this invention, the illustrative showing including a metallic member 27 having a generally planar shaped central section 28 of circular configuration and having a central aperture 30. The metallic member 27 further comprises an outer annular section 32 which is offset from the centrally apertured disc shaped section 28. This outer annular section 32 is connected to the central section 30 by means of a truncated conical section 34. The metallic member 27 further includes a holding section 36 to serve as a holding means, as will appear. A sheath or layer of flexible rubber-like material of the improved type such as that referred to above as Silastic LS–53 provides a covering 38 over preferably both the inner and outer surfaces of the metallic member 27. In the region between the annular section 32 and the truncated conical section 34, the outer portion of the covering 38 includes a mass concentration which may be in the form of an annular bead 40. It will be appreciated that this mass concentration may also take various other shapes, such as spaced projections, for example. The covering 38 is secured to the base member 34 by crimping the annular holding section 36 in over bead 40, as subsequently described below in connection with assembly. The rubber-like covering 38 further has an inwardly extending annular portion 42 for bridging the space between the inner edge 30 of the central section 28 and the outer surface 44 of the inner ring 16 to maintain the lubricant in its repository and to prevent entry of dirt, as aforesaid.

The bearing seals 22 are assembled to the remaining portion of the bearing in the manner now to be described. The seal having the configuration as shown in FIG. 3, is inserted, for example into the right side of the bearing of FIG. 1, so that the rubber-like material at the points designated by the numeral 38a is in contact with the wall portion 10a of the outer ring 10. Pressure is then preferably applied against the surface 36a of the section 36 to bend the same inwardly toward the annular bead 40. Pressure is continued until the inner edge end 36b of the section 36 is in close proximity to or contacting the rubber-like material in the vicinity of the annular bead 40. Ideally, the end 36b will be embedded within the annular bead 40, as seen in FIG. 2, so that the bead is squeezed in a direction generally transverse to the force against the bead, resulting in the formation of the raised portions 40a and 40b. If desired, the end 36b of the holding section 36 may be rounded as at 36c so as not to pierce the bead material 40 either during assembly or during the bearing use. The bead 40 and the sheath 38 are thus restrained in position on the metallic member 27 to keep it in proper position during the use of the bearing. Additionally, it will be seen that the seals 22 are held in position by the lips 26 on the outer ring 10 and that a tight lubricant-retaining seal is provided where the portion 38a of the rubber-like material bears against the surface 10a of the outer ring.

FIG. 4 shows a further embodiment of the bearing seal, indicated by the numeral 52 therein. In this embodiment, it will be seen that the rubber-like sheath portion 34 does not extend to cover the inside surface of the annular section 32 of the metallic member 27. Accordingly, when the bearing seal 52 of FIG. 4 is held in place in the bearing, see FIG. 5, the inside surface of the section 32 directly engages the surface 10a of the outer ring 10.

Referring further to FIG. 5, an alternative arrangement is shown whereby the rubber-like material is restrained from movement with respect to the metallic member 27. Thus it will be seen in FIG. 5 that the metallic section 36 is formed generally around the bead 40 to entrap the same by surrounding it rather than being positioned so that the end 36b entraps the bead by squeezing it, as in FIG. 2. In FIG. 5, the end 36 may or may not engage the rubber section 38b, as desired.

It will be appreciated that by means of the present invention a novel bearing construction is provided which has superior resistance to fuels, oils, and solvents and which can be used over a considerably wider temperature range than was heretofore possible without damage to the bearing seal, or impairment of its proper operation due to loss of lubricant or entry of foreign substances. These and other advantages are made possible by the improved construction taught herein, without which the superior flexible rubber-like material referred to above, could not be satisfactorily employed as part of the bearing structure.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A bearing seal comprising
    a member having a generally disc shaped portion with a central aperture therein, and an annular portion curved outwardly and inwardly from the outer periphery thereof,
    a sheath of flexible rubber-like material in intimate contact with the surfaces of said disc shaped portion only,
    said sheath extending inwardly into said aperture,
    said sheath including a formation in the shape of an annular ridge, along the outer periphery of its exterior side,
    and said annular portion substantially surrounding said ridge and entrapping the same, whereby said sheath is held in non-removable relationship within said surrounding annular portion.

2. The invention described in claim 1 wherein said annular portion is integral with said member and comprises a metallic lip bent inwardly from the outer edge of said disc shaped portion, and said annular ridge has an annular depression inside thereof into which the edge of said annular portion extends thereby restraining said sheath from radial movement with respect to said member.

3. The invention described in claim 1 wherein said rubber-like material comprises a fluorosilicone rubber having a very low bond strength with said member, whereby said bearing seal has the improved characteristics of higher resistance to fuels, oils and solvents.

4. A bearing seal comprising
    a metallic member including a generally planar shaped central section of circular configuration having a central aperture,
    an outer annular section, said latter section being offset from the plane of said central section,
    a truncated conical section connecting said central section to said outer annular section, a sheath of flexible rubber-like material in intimate contact with the surfaces of said central, truncated and outer annular sections of said metallic member and extending inwardly from the inner edge of said central section,
    a further section extending generally from the outer portion of said outer annular section inwardly toward said truncated conical section and having its inner peripheral edge in close spaced relation with one of said other sections,
    said sheath having an annular mass concentration, said mass concentration being entrapped within an annular chamber formed by the peripheral edge of said further section being placed in close-space relationship with said outer annular section to retain said sheath in place upon said metallic member.

5. A bearing seal comprising
    a metallic member including a generally planar shaped central section of circular configuration having a central aperture,
    an outer annular section, said latter section being offset from the plane of said central section,
    a truncated conical section connecting said central section to said outer annular section, a sheath of flexible rubber-like material in intimate contact with the surfaces of said outer truncated and central metallic members and extending inwardly from the inner edge of said central section,
    a further annular section extending generally from the outer portion of said outer annular section inwardly toward said truncated conical section and having its inner peripheral edge in close spaced relation with one of said other sections,
    said sheath having an annular mass concentration in the region of said peripheral edge, said mass concentration being entrapped between said latter mentioned edge of said further section and the surface of one of said other sections 6. A sealed bearing comprising
    an inner ring and an outer ring with means for reducing the friction therebetween,
    a bearing seal extending between said inner and outer rings, said bearing seal including
    a member having a generally disc shaped portion with a central aperture therein, and an annular portion extending generally from the outer periphery of said disc,
    a sheath of flexible rubber-like material in intimate contact with the surface of said disc shaped portion,
    said sheath extending inwardly into said aperture for sealing contact with said inner ring,
    said sheath including a formation in the shape of an annular ridge along the outer periphery of its exterior side,
    and said annular portion extending inwardly from the outer periphery of said disc into engaging contact with said ridge and entrapping the same, whereby said sheath is held in substantial non-movable relationship with said member.

7. The invention described in claim 6 wherein said outer ring includes means for holding said bearing seal in fixed position thereon.

8. The invention described in claim 6 wherein said rubber-like material is in contact with said inner and outer rings to thereby prevent loss of lubricant from said bearing.

References Cited
UNITED STATES PATENTS

| | | | |
|---|---|---|---|
| 2,279,669 | 4/1942 | Friskney | 277—95 X |
| 2,718,441 | 9/1955 | Smith | 308—187.2 |
| 2,755,113 | 7/1956 | Baumheckel | 308—187.2 |
| 2,764,433 | 9/1956 | Cobb | 308—187.2 |
| 2,850,792 | 9/1958 | Cobb | 308—187.2 |
| 2,915,345 | 12/1959 | Workman | 308—187.2 |
| 3,114,560 | 12/1963 | Dunn | 308—187.2 X |
| 3,145,996 | 8/1964 | Ninos | 308—187.2 X |
| 3,203,740 | 8/1965 | Peickii | 308—187.2 |
| 3,272,574 | 9/1966 | Tassone | 308—187.2 |

CARLTON R. CROYLE, *Primary Examiner.*

MARTIN P. SCHWADRON, *Examiner.*

L. L. JOHNSON, *Assistant Examiner.*